(12) United States Patent
Bigagli et al.

(10) Patent No.: US 7,844,969 B2
(45) Date of Patent: Nov. 30, 2010

(54) GOAL-ORIENTED PREDICTIVE SCHEDULING IN A GRID ENVIRONMENT

(75) Inventors: David Bigagli, Toronto (CA); Shutao Yuan, Markham (CA); James Pang, Toronto (CA)

(73) Assignee: Platform Computing Corporation, Markham, Ontario (CA)

( * ) Notice: Subject to any disclaimer, the term of this patent is extended or adjusted under 35 U.S.C. 154(b) by 1748 days.

(21) Appl. No.: 10/871,502

(22) Filed: Jun. 17, 2004

(65) Prior Publication Data

US 2005/0283534 A1    Dec. 22, 2005

(51) Int. Cl.
*G06F 9/46* (2006.01)
*G06F 15/173* (2006.01)
*G06F 15/16* (2006.01)

(52) U.S. Cl. .................. 718/103; 718/102; 718/104; 718/105; 718/107; 709/226; 709/229

(58) Field of Classification Search ................. 718/102, 718/103, 104, 105, 107; 709/226, 229
See application file for complete search history.

(56) References Cited

U.S. PATENT DOCUMENTS

| | | | |
|---|---|---|---|
| 3,648,253 A | 3/1972 | Mullery et al. | |
| 4,839,798 A | 6/1989 | Eguchi et al. | |
| 5,031,089 A | 7/1991 | Liu et al. | |
| 5,428,781 A | 6/1995 | Duault et al. | |
| 5,442,791 A | 8/1995 | Wrabetz et al. | |
| 5,467,268 A | 11/1995 | Sisley et al. | |
| 5,473,773 A | 12/1995 | Aman | |
| 5,504,894 A | 4/1996 | Ferguson et al. | |
| 5,522,070 A | 5/1996 | Sumimoto | |
| 5,603,029 A | 2/1997 | Aman et al. | |
| 5,621,663 A | 4/1997 | Skagerling | |
| 5,675,739 A | 10/1997 | Eilert et al. | |
| 5,742,772 A | 4/1998 | Sreenan | |
| 5,805,785 A | 9/1998 | Dias et al. | |
| 5,812,844 A | 9/1998 | Jones et al. | |
| 5,872,931 A | 2/1999 | Chivaluri | |
| 5,889,944 A | 3/1999 | Butt et al. | |
| 5,893,905 A | 4/1999 | Main et al. | |

(Continued)

FOREIGN PATENT DOCUMENTS

WO    WO 2004/038587 A2    6/2004

OTHER PUBLICATIONS

Dan et al. "Connecting client objectives with resource capabilities: an essential component for grid service management infrastructures", 2004, ACM, pp. 57-64.*

(Continued)

*Primary Examiner*—Chat C Do
*Assistant Examiner*—Kenneth Tang
(74) *Attorney, Agent, or Firm*—Baker & McKenzie LLP

(57) ABSTRACT

A method for scheduling jobs in a networked computing grid is described. The method includes scheduling jobs to meet goals related to execution of the jobs within the computing grid. The jobs may be scheduled by evaluating job execution goals against available resource slots provided by the computing grid. Also disclosed are related methods for scheduling jobs in which the jobs are submitted to service classes having defined job execution goals, and wherein the jobs are scheduled according to the job execution goals of the service classes.

3 Claims, 4 Drawing Sheets

U.S. PATENT DOCUMENTS

| | | | |
|---|---|---|---|
| 5,903,757 | A | 5/1999 | Gretz et al. |
| 5,978,829 | A | 11/1999 | Chung et al. |
| 6,195,676 | B1 | 2/2001 | Spix et al. |
| 6,230,183 | B1 | 5/2001 | Yocom et al. |
| 6,247,041 | B1 | 6/2001 | Kruger et al. |
| 6,263,358 | B1 | 7/2001 | Lee et al. |
| 6,282,561 | B1 | 8/2001 | Jones et al. |
| 6,353,844 | B1 | 3/2002 | Bitar et al. |
| 6,356,917 | B1 | 3/2002 | Dempsey |
| 6,385,638 | B1 | 5/2002 | Baker-Harvey |
| 6,393,455 | B1 | 5/2002 | Eilert et al. |
| 6,412,026 | B1 | 6/2002 | Graf |
| 6,463,454 | B1 | 10/2002 | Lumelsky et al. |
| 6,516,350 | B1 | 2/2003 | Lumelsky et al. |
| 6,631,354 | B1 | 10/2003 | Leymann et al. |
| 6,643,614 | B2 | 11/2003 | Ding |
| 6,687,731 | B1 | 2/2004 | Kavak |
| 6,694,345 | B1 | 2/2004 | Brelsford et al. |
| 6,714,960 | B1 | 3/2004 | Bitar et al. |
| 6,728,961 | B1 | 4/2004 | Velasco |
| 6,859,926 | B1* | 2/2005 | Brenner et al. .............. 718/100 |
| 2002/0049841 | A1* | 4/2002 | Johnson et al. ............. 709/225 |
| 2003/0126260 | A1 | 7/2003 | Husain |
| 2004/0019624 | A1 | 1/2004 | Sukegawa |
| 2004/0059966 | A1 | 3/2004 | Chan et al. |
| 2004/0064552 | A1 | 4/2004 | Chong |
| 2004/0194107 | A1* | 9/2004 | Masuoka .................... 718/100 |
| 2005/0172291 | A1* | 8/2005 | Das et al. .................... 718/104 |
| 2005/0234937 | A1* | 10/2005 | Ernest et al. ................ 707/100 |
| 2006/0005181 | A1* | 1/2006 | Fellenstein et al. .......... 717/174 |
| 2006/0048157 | A1* | 3/2006 | Dawson et al. ............. 718/104 |
| 2006/0294238 | A1* | 12/2006 | Naik et al. .................. 709/226 |

OTHER PUBLICATIONS

Doulamis et al. "Non-linear Prediction of Rendering Workload for Grid Infrastructure", Sep. 25-29, 2002, National Technical University of Athens, pp. 1-12.*

"Specifying and Monitoring Guarantees in Commercial Grids through SLA", HP Labs 2002 Technical Reports, Akil Sahai, Sven Graupner, Vijay Machiraju, and Aad Van Moorsel, Nov. 14, 2002.

"SLA-Driven Management of Distributed Systems Using the Common Information Model", IBM Research Report, Markus Debusmann and Alexander Keller, Aug. 16, 2002.

"Job-Scheduler Exceptions and Alarms", Chapter 4, Platform Job Scheduler User Guide, 2002.

"The Anatomy of the Grid: Enabling Scalable Virtual Organizations", International J. Supercomputer Applications, Ian Foster, Carl Kesselman, and Steven Tuecke, 2001.

"The Physiology of the Grid: An Open Grid Services Architecture for Distributed Systems Integration", Open Grid Service Infrastructure WG, Global Grid Forum, Ian Foster, Carl Kesselman, Jeffrey M. Nick, and Steven Tuecke, Jun. 22, 2002.

"Snap: A Protocol for Negotiating Service Level Agreements and Coordinating Resource Managment in Distributed Systems", Lecture Notes in Computer Science, K.Czaikowski, I. Forster, C. Kesselman, V. Sander, and S. Tuecke, vol. 2537, pp. 153-183, 2002.

"Agreement-based Grid Service Management (OGSI-Agreement)", Global Grid Forum, K. Czajkowski, A. Dan, J. Rofrano, S. Tuecke, and M. Xu, Jun. 12, 2003.

http://www-unix.globus.org/developer/gram-architecture.
html—GT3 GRAM Architecture.

International Preliminary Report on Patentability for PCT/IB2005/001721 dated Dec. 20, 2006.

A. Mirtchovski, R. Simmonds, and R. Minnich, "Plan 9—An Intergrated Approach to Grid Computing", http://www.9grid.net/papers/ipdps-04/plan9-grid.pdf.

M. Jones, P. Leach, R. Draves and J. Barrera, "Support for user-centric modular real-time resource managment in the rialto operation system", in Proc. 5th Intl. Workshop on Network and Operating System Support for Digital Audio and Video, Durham, New Hampshire, pp. 55-66, Apr. 1995.

V. Berstis, "Fundamentals of Grid Computing", Redbooks Paper, IBM Corp. 2002. http://www.redbooks.ibm.com/redpapers/pdfs/redp3613.pdf.

International Search Report for PCT/IB2005/001721.

* cited by examiner

GOAL-ORIENTED PREDICTIVE SCHEDULING IN A GRID ENVIRONMENT

CROSS-REFERENCE TO RELATED APPLICATIONS

This application is related to U.S. patent application Ser. No. 10/871,286, entitled "Job-Centric Scheduling in a Grid Environment" (Inventors: Bingfeng Lu, Jin Song Zhong, and Jason Lam), and U.S. Pat. No. 7,340,654, entitled "Autonomic Monitoring in a Grid Environment" (Inventors: David Bigagli and Xiaohui Wei), each of which were filed on the same day as the present application and each of which are hereby incorporated by reference.

TECHNICAL FIELD

Disclosed embodiments herein relate generally to computing grid environments, and more particularly to methods for scheduling jobs in such environments.

BACKGROUND

The increasing complexity of electronic tasks (e.g. executable programs such as computational tasks, command execution, data collection, etc.) has increased the demand for resources used in accomplishing such tasks. Resources may include hardware that aids in completing electronic tasks, such as servers, clients, mainframe computers, networks, network storage, databases, memory, CPU time, and scientific instruments. Resources may also include software, available network services, and other non-hardware resources.

One response to the increased demand for resources has been the development of networked computing grid systems, which operate to integrate resources from otherwise independent grid participants. Computing grid systems generally include hardware and software infrastructure configured to form a virtual organization comprised of multiple resources in often geographically disperse locations.

Electronic tasks, often referred to as "jobs," typically require certain amounts and/or types of resources for completion. Once a job is created, it is to be assigned, or scheduled, to sufficient and compatible resources within a computing grid system. However, jobs are often subject to specified goal requirements, which can complicate the scheduling of such jobs. For example, project planners may need to schedule jobs that should be completed by a predetermined deadline. In such instances, the fate of the project may depend on whether the job is appropriately scheduled.

BRIEF SUMMARY

Disclosed herein are methods for scheduling jobs within a grid environment. In one exemplary embodiment, a method for scheduling jobs is described in which the jobs are to be scheduled according to goal requirements. The method includes providing a mathematical model that represents the goal requirements in view of the available resources of the grid and solving the mathematical model to determine the optimum number of resources to meet the goal requirements. Upon determining the optimum number of resources, the jobs are scheduled in satisfaction of the goal requirements.

The goal requirements may be associated with a deadline goal, a velocity goal, a throughput goal, and/or a queue time goal. The deadline goal is satisfied by scheduling jobs for execution by a certain deadline. The velocity goal is satisfied by scheduling jobs to meet a desired velocity. The throughput goal pertains to scheduling jobs for execution such that they are completed according to a configured throughput rate. The queue time goal relates to scheduling jobs within a certain queue time.

In some embodiments, methods are provided for scheduling jobs according to any combination of the above-described goals and/or additional goals.

BRIEF DESCRIPTION OF THE DRAWINGS

Reference is now made to the following descriptions taken in conjunction with the accompanying drawings.

DETAILED DESCRIPTION

The present disclosure relates to goal-oriented predictive scheduling methods that may be used in distributed resource management, or grid, systems. FIGS. 1-4 illustrate an exemplary grid architecture and associated software modules that enable grid participation, whereas the remaining figures disclose the goal-oriented predictive scheduling methods of the present disclosure.

Figure 1:
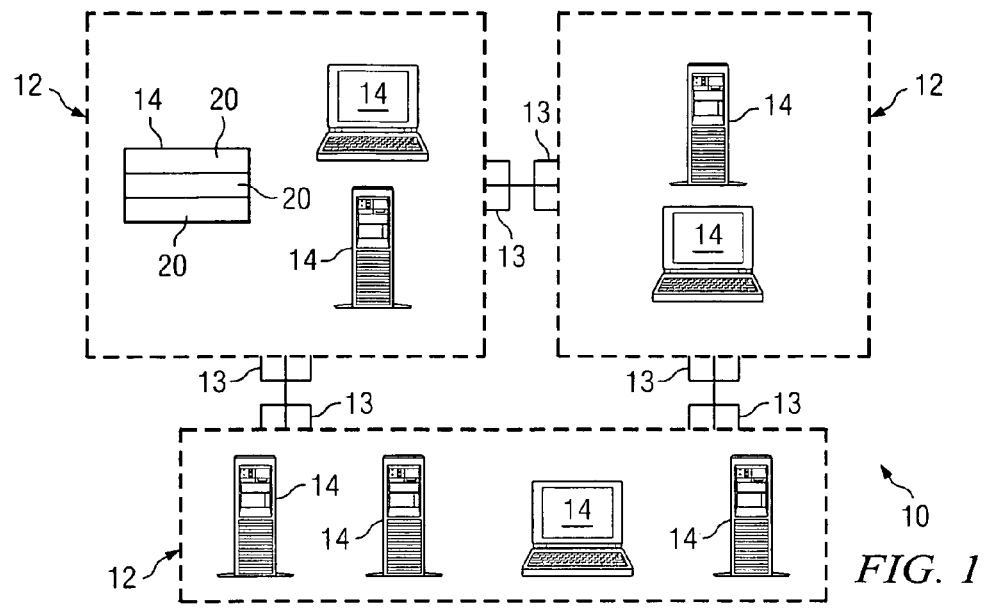
FIG. 1 illustrates a diagrammatic view of a grid system having a plurality of clusters according to one embodiment of the present disclosure.

FIG. 1 illustrates a computing grid 10 having a plurality of clusters 12, which are configured to communicate with one another to share resources across the grid. The clusters 12 generally include a plurality of commonly linked machines, or "hosts" 14, which are enabled to provide resources such as CPU time, database storage, and computing capabilities. Each cluster 12 is typically protected by a security mechanism, such as a firewall 13. A host 14 may be any machine capable of providing resources, such as a personal computer (PC), a server, or other computing device known in the art. Resources on a particular host 14 may be divided into slots 20, which generally refer to certain amounts of electronic task capacity available on the host 14. By breaking down the task capacity into slots 20, the scalability of the grid 10 can be increased, thereby increasing the resources available on the grid.

Grid systems, such as the grid 10, are typically built by configuring each cluster 12 to facilitate resource sharing on the grid. Such configuration may occur by loading grid-enabling software onto the hosts 14 or other devices associated with the clusters 12. In doing so, the operating system services provided by the hosts 14 are extended to create a single system image for the cluster 12. The grid-enabling software of the present disclosure may be in the form of simple object access protocol (SOAP/XML protocol) and may be configured to support operating systems such as Linux®, Windows® and Unix® by deploying software daemons that run on the preexisting operating systems provided for the cluster 12. The grid-enabling software may be broken down into various software modules, which include various processes for facilitating operation of the grid 10.

Figure 2:
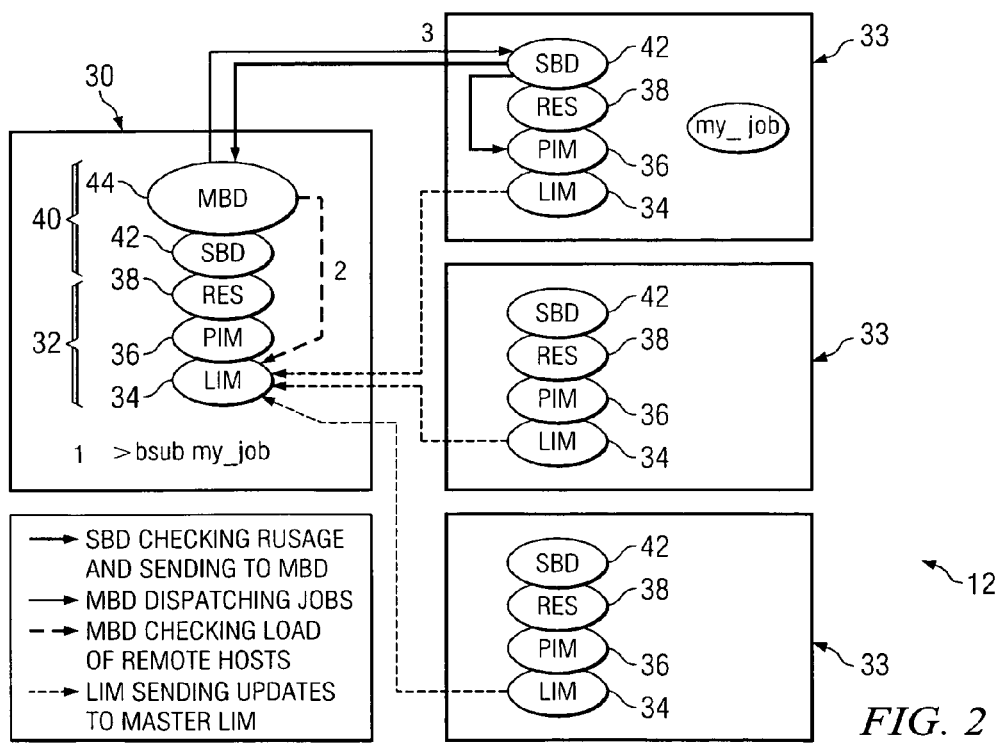
FIG. 2 illustrates an architecture associated with the clusters of the grid system of FIG. 1.

Referring now to FIG. 2, within the cluster 12 the grid-enabling software may be initially loaded onto a master host 30 selected for the cluster. The master host 30 may be a selected host 14 associated with the cluster 12, and is typically the host associated with an administrator of the cluster (hereinafter "system administrator"). The software may be built in layers, beginning with a base system 32. The base system 32 generally provides dynamic load balancing and transparent access to resources available within the cluster 12. The base system 32 includes a load information manager (LIM) component 34, which collects resource information from slave hosts 33 within the cluster 12 as will be further described. As with the master host 30, the slave hosts 33 may be any hosts 14 within the cluster 12. The base system 32 further includes a process information manager (PIM) component 36, which gathers process information such as configuration data. Upon startup, the load information manager 34 may read configuration data compiled on the process information manager 36. The base system 32 also includes a remote execution server (RES) 38, which is responsible for executing jobs remotely and transparently within the cluster 12.

A batch system 40 is then loaded as a layer on top of the base system 32, and includes a slave batch daemon 42 and a master batch daemon 44. The slave batch daemon 42 includes processes for receiving and processing instructions provided by the master batch daemon 44. The master batch daemon 44 is a level higher than the slave batch daemon 42, and is configured to manage not only the slave batch daemon 42 of the master host 30, but each of the slave batch daemons associated with the plurality of slave hosts 33. Although only three slave hosts 33 are shown, the number of hosts associated with the cluster 12 can vary considerably.

Grid-enabling software is also deployed onto the slave hosts 33 to facilitate resource sharing on the grid 10. In particular, the base system 32 of the grid software is loaded onto the slave hosts 33. As such, the slave hosts 33 are configured with their own load information managers 34, process information managers 36 and remote execution servers 38. Additionally, the slave hosts 33 are provided with their own slave batch daemons 42, which receive instructions from the master batch daemon 44 and facilitate the execution of the jobs (via the remote execution server 38) that are sent to the particular hosts.

Upon installation, the master batch daemon 44 can check the configuration of the cluster 12 and contact each of the slave batch daemons 42 of the slave hosts 33 to initiate host updates to the load information manager 34 of the master host 30. The host updates may be provided by the load information managers 34 of the slave hosts 33 and sent to the load information manager 34 of the master host 30, thereby aggregating resource data for the cluster 12. If a job is submitted to the master host 30, the master host can analyze the resource data for the cluster 12, and dispatch the job to a particular slave host 33 if the load information corresponds to the requirements of the job. Additionally, the slave batch daemons 42 of the slave hosts 33 can check resource usage for the slave hosts 33 and send such information to the master batch daemon 44 of the master host 30.

Figure 3:
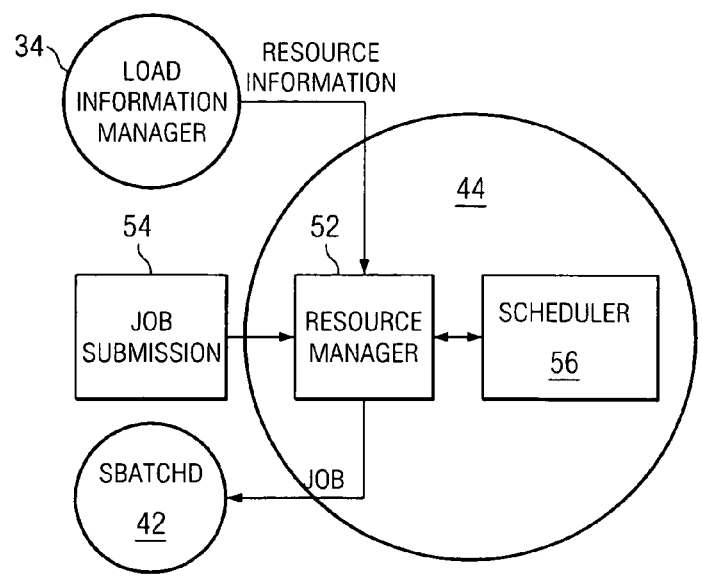
FIG. 3 illustrates processes associated with a component of the architecture of FIG. 2.

Referring now to FIG. 3, the master batch daemon 44 includes processes for generally functioning as a cluster workload, or resource, manager 52. For example, the resource manager 52 may allocate the collection of resources associated with the cluster 12 and match such resources with the resource requirements associated with a particular job to be executed on the grid 10. Accordingly, the resource manager 52 implemented within the master batch daemon 44 can receive job submissions 54 and transmit such jobs to slave batch daemons 42, which execute the jobs. In this manner, the master batch daemon 44 effectively enforces scheduling policies associated with the grid 10 as will be further described. Scheduling policies are typically driven by the requirements of particular jobs to be executed on the grid 10.

In some embodiments, a scheduler 56 is associated with the master batch daemon 44 and is configured to facilitate job scheduling within the cluster 12. In particular, the scheduler 56 may process a job submission 54 to evaluate the job's resource requirements, analyze the job's resource requirements against the resources provided by the hosts 14 within the cluster 12, and schedule the job to a compatible host or hosts. In other embodiments, the scheduler 56 may schedule jobs according to goal requirements defined for the jobs as will be further described. As discussed above, the number and type of resources provided by the individual hosts 14 within the cluster 12 may be determined by the submission of such data from the load information managers 34 associated with the hosts.

Various plug-in components may be provided as part of the scheduler 56. For example, reservation, parallel, and user-defined components may be provided as plug-in components to generally aid the scheduler 56 in making job-scheduling decisions. Various other plug-in components are contemplated as being provided with the scheduler 56.

Figure 4:
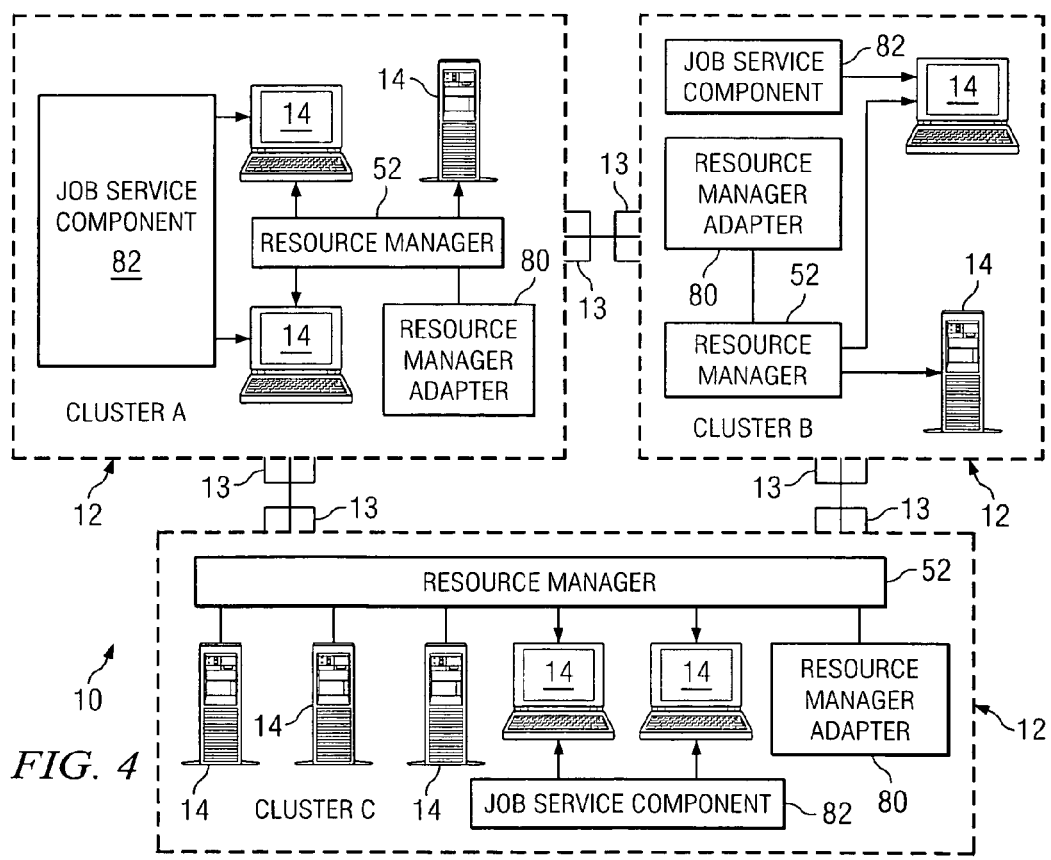
FIG. 4 illustrates a modified diagrammatic view of the grid system of FIG. 1.

Referring to FIG. 4, the hosts 14 and the resource managers 52 are shown in their associated clusters 12. Each cluster 12 may further include a resource manager adapter 80, which may be deployed onto the grid 10 to enable communication between the various clusters associated with the grid 10. For example, the resource manager adapter 80 may comprise a Java® application programming interface (API) and a simple object access protocol (SOAP) interface.

A job service component 82 is further provided with each cluster 12 to generally provide an interface for inputting jobs into the grid. The job service component 82 comprises software processes configured to receive input from an end-user and create a job based on the end-user's request. The job service component 82 may be deployed onto any machine associated with the grid 10, such as an end-user's PC. The grid 10 may include one or several job service components 82, depending on the particular parameters of the system. In some embodiments, jobs input into the grid 10 will have predetermined resource requirements, e.g., two Linux® servers with over 2 gigabytes of memory, and thus the jobs will need to be executed on the grid according to these resource requirements. If a job is to be executed on a particular cluster 12, the job can be sent to the resource manager 52, which can then schedule the job accordingly.

Figure 5:
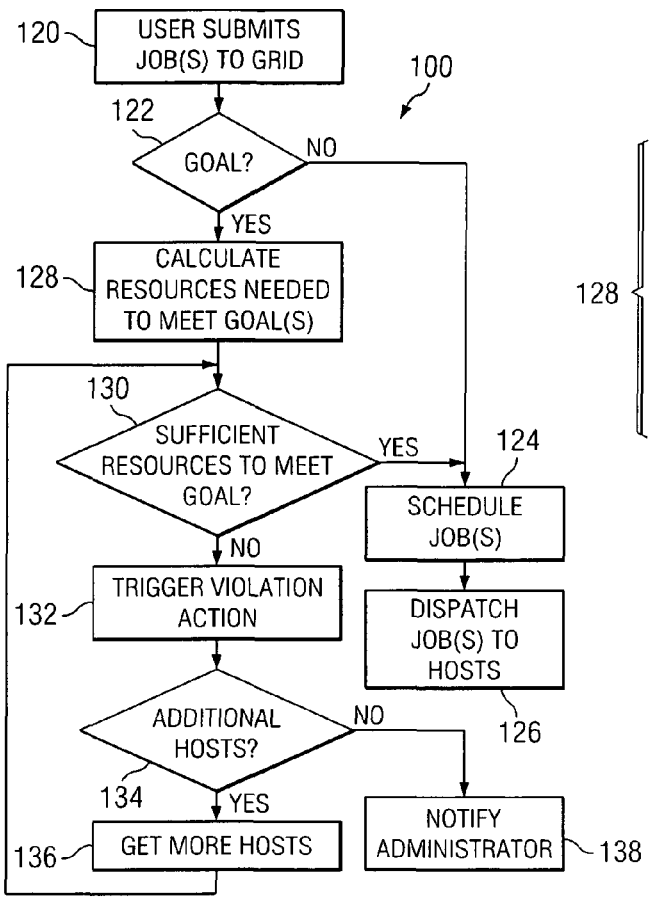
FIG. 5 is a flowchart depicting a job-scheduling method incorporating goal requirements according to one embodiment of the present disclosure.

FIG. 5 illustrates a goal-oriented job scheduling process 100 in a computing grid environment according to one embodiment of the present disclosure. The scheduling process 100 is represented in FIG. 5 as including several actions, which may be executed via a software application implemented into existing computing grid systems. In some embodiments the goal-oriented job scheduling process 100 may be configured as a portion of the job service component 82 (FIG. 4), and thus deployed onto an end-user's PC.

In one exemplary embodiment, the scheduling process 100 begins with a grid user submitting a job request (action 120) that may include specified goal requirements. In practice, the job request is typically submitted via the job service component 82 (FIG. 4) associated with the grid system 10.

After creation of a job ("Job J") via the job service component 82, the scheduling process 100 first evaluates whether Job J has associated scheduling goals (action 122). If Job J is created without specified goals, then no predictive scheduling is necessary and Job J may be scheduled (action 124) by transferring Job J to a resource management scheduler associated with the grid system. The scheduler can then find appropriate resources to execute Job J and dispatch Job J accordingly (action 126).

If Job J does have a specified goal requirement or multiple goal requirements, then a defined mathematical model is solved to calculate the optimum or sufficient number of resources to meet the goal(s) (action 128). In some embodiments, goal requirements associated with scheduling of jobs may include deadline, velocity, throughput and/or queue time goals. The mathematical models according to the present disclosure can be generally described as non-linear constrained optimization problems, which, when solved, aid in scheduling jobs to slots within the grid while minimizing the resources allocated to execute the jobs. The mathematical models (further described below) generally include computing models and associated algorithms having variables associated with the planned workload demanded by the jobs, the slots available on the grid system, the constraints on such resources and/or the scheduling goal(s).

The scheduling process 100 further includes evaluating whether there are sufficient resources to execute Job J according to the goal requirements (action 130). If sufficient resources are found, then Job J may be submitted to the scheduler, which can schedule Job J (action 124) and dispatch Job J to the appropriate hosts (action 126). If, however, there are insufficient resources to meet the goal requirements, a violation action may be triggered (action 132). Upon the occurrence of a violation, the scheduling process 100 may evaluate whether other hosts are available (action 134) by launching a program to petition other hosts to join the grid 10. The system administrators responsible for administering the grid 10 can configure additional hosts to join the grid. If additional hosts are provided (action 136), the scheduling process 100 will cycle back to evaluate whether the additional hosts can provide sufficient resources to meet the goal requirements (action 130). If additional hosts cannot be obtained, then the scheduling process 100 can notify an administrator (action 138) of the particular cluster 12 associated with the submission of Job J.

Additionally, the scheduling process 100 according to the present disclosure may be invoked periodically after the expiration of a certain amount time, such as 5 seconds. Therefore, goal requirements may be satisfied after one cycle of the scheduling process 100, or alternatively, after several cycles of the scheduling process.

Exemplary goal requirements and associated methods for meeting such goal requirements will now be discussed in turn. However, the following descriptions are not meant to be an exhaustive listing of goals that can be addressed according to the methods of the present disclosure. Neither are the methods and architectures meant to be limited to the algorithms discussed below.

A. Deadline Goal

Figure 6:
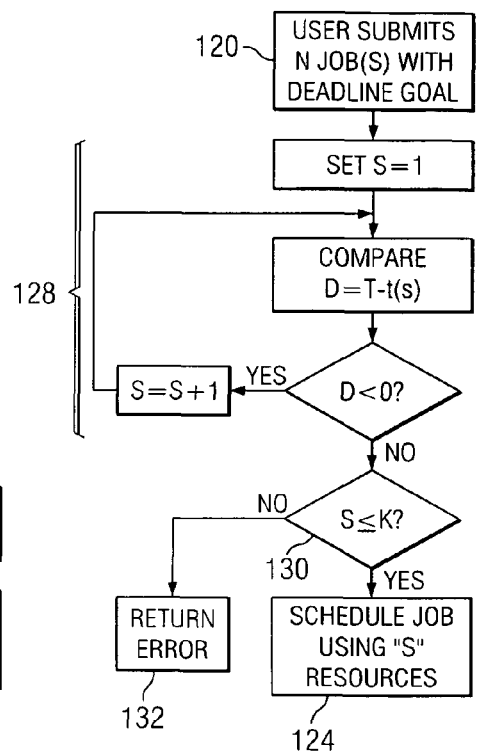
FIG. 6 is a flowchart depicting a job-scheduling method to schedule a job having a deadline goal.

Referring to FIG. 6, a grid user may desire to schedule a job or a plurality of jobs (N) on a grid to meet a deadline goal (T). The scheduling process 100 includes solving a defined mathematical model to determine the optimum number of slots (s) that will ensure that the N job(s) are completed by time t(s) (action 128). Accordingly, time t(s) should be optimized to be a time just prior to a deadline time (T):

$$T-t(s)>=0 \&\& T-t(s-1)<0.$$

The grid system can have a certain number of slots (K) available to run the N jobs. Moreover, the N jobs subject to the deadline can have an average run time (R). Thus, the following computing model is representative of the completion time required for the N jobs when executed on a specified number of slots (s):

$$t(s)=\text{ceil}(N/s)*R; \text{ where } 1<=s<=K.$$

The optimum number of slots (s) to complete the N jobs by the specified deadline (T) is then determined by inserting various completion times t(s) into the following deadline algorithm, beginning with the completion time associated with one slot:

| | |
|---|---|
| Action 1: | s = 1; |
| Action 2: | D = T − t(s); |
| Action 3: | if D < 0, then s = s + 1; go to Action 2; |
| Action 4: | if s <= K, then find the answer, exit; else cannot find s to meet the goal, trigger the goal violation action. |

If the optimum number of slots (s) is determined, then the pending N jobs will be dispatched to the resource management scheduler, which assigns the jobs to the appropriate hosts (action 124). The hosts can provide the appropriate number of slots (s) determined by the deadline algorithm. However, if the optimum number of slots (s) cannot be found, then a violation action will be triggered (action 132) and will be communicated to the grid user, such as by an email notification.

Deadline Example

By way of example, it is desired that 6 pending jobs each having an average run time of 3 minutes be completed by a specified deadline of 7 minutes. In this example, the grid system has 6 slots available to run the jobs. As detailed above, the time t(s) for a given number of slots (s) is calculated, and then subtracted from the predetermined deadline time T to evaluate whether the deadline goal can be met with that particular number of slots (s). The optimum number of slots (s) required for completing the 6 jobs and meeting the deadline of 7 minutes is determined as follows:

| | |
|---|---|
| Iteration 1: | t(1) = ceil(6/1)*3 = 18 |
| | D = 7 − 18 = −11 < 0; |
| Iteration 2: | t(2) = ceil(6/2)*3 = 9 |
| | D = 7 − 9 = −2 < 0 |
| Iteration 3: | t(3) = ceil(6/3)*3 = 6 |
| | D = 7 − 6 = 1 > 0. |

Figure 7:
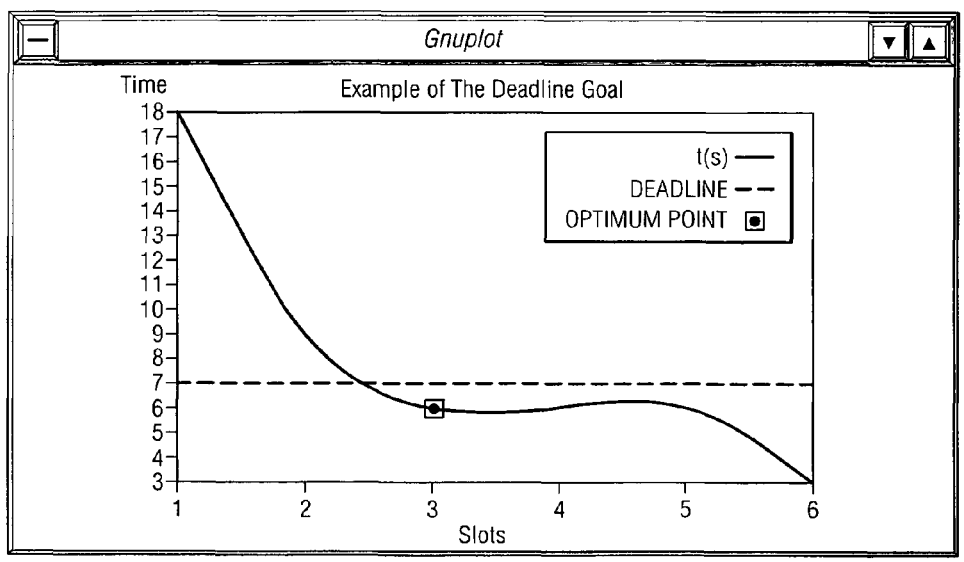
FIG. 7 is a graphical view depicting the number of resources necessary to meet a deadline goal.

Therefore, the optimum number of slots is 3. Accordingly, the grid should run the jobs on 3 slots in order to complete the 6 pending jobs by the deadline of 7 minutes. FIG. 7 depicts a graphical representation of the preceding example. Accordingly, the 6 jobs are sent to the resource management scheduler, which schedules the jobs to 3 slots.

B. Velocity Goal

Figure 8:
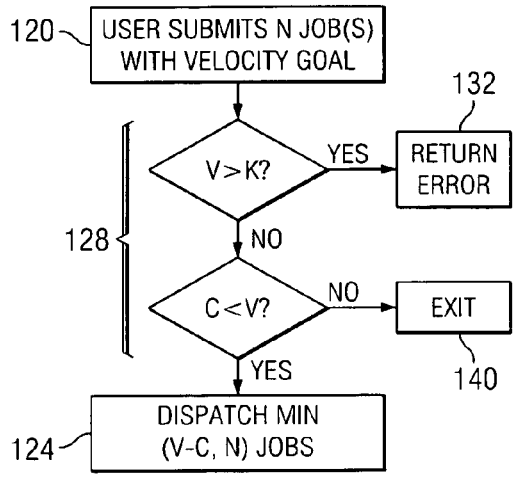
FIG. 8 is a flowchart depicting a job-scheduling method to schedule a job having a velocity goal.

Referring to FIG. 8, in another embodiment, a grid user may desire to schedule a number of jobs (N) on the grid to meet a velocity goal (V). For example, a grid user may desire that a fixed number of jobs (N) be running on the grid at any given time. Accordingly, the scheduling process 100 includes solving a defined mathematical model to determine the optimum number of jobs out of the N jobs that should be running at any given time to meet the specified velocity goal (V) (action 128). The grid system can have a defined number of slots (K) available to run the N jobs. Additionally, the grid system can be running a specified number of jobs (C) at any given time. Accordingly, dispatch of the N jobs can be optimized to meet the velocity goal (V) by execution of the following velocity algorithm:

| | |
|---|---|
| Action 1: | If V > K, then velocity goal cannot be achieved; trigger violation action; |
| Action 2: | If C < V, then dispatch min(V − C, N) jobs; else exit. |

If V>K, then the velocity goal cannot be met, and a violation action may be triggered (action 132) and sent to the grid user, such as by an email notification. If V<K, then the velocity goal (V) is evaluated against the amount of jobs (C) that the grid can run. If C<V, then the above parameters may be inserted into the velocity algorithm, which calculates the appropriate number of resources to accommodate the dispatch of the N jobs and to meet the velocity goal. The N jobs are then sent to the resource management scheduler, and are scheduled to the requisite number of slots (action 124) to meet the velocity goal. If C>V, then the scheduling process will terminate (action 140) and restart upon the expiration of a certain amount of time.

Velocity Example

By way of example, it is desired that 7 pending jobs be executed on the grid while guaranteeing that 5 jobs are running at any given time. In this example, the grid system has 10 slots available to run the jobs and 3 slots are currently running jobs. Accordingly, the scheduling process 10 includes executing the above-described velocity algorithm:

| | |
|---|---|
| Action 1: | 5 < 10, go to action 2; |
| Action 2: | 3 < 5, then dispatch min(2, 7) jobs. |

Therefore, 2 of the 7 jobs should be dispatched to meet the velocity goal. The scheduler will then assign the 2 jobs to 2 slots to meet the velocity goal of 5 jobs running at any given time. Thereafter, the scheduling process 100 will be invoked periodically to schedule the remaining 5 jobs subject to the velocity goal.

C. Throughput Goal

Figure 9:
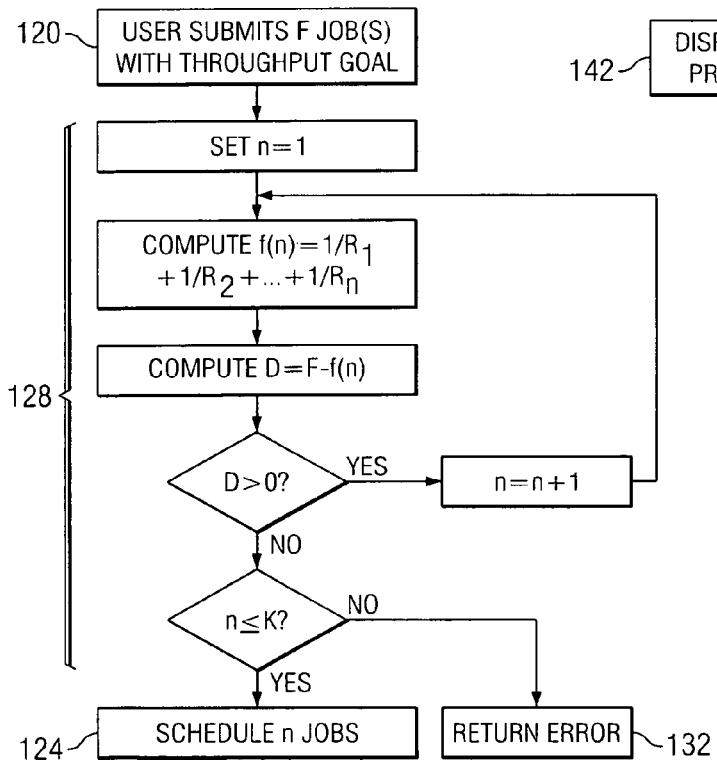
FIG. 9 is a flowchart depicting a job-scheduling method to schedule a job having a throughput goal.

Referring to FIG. 9, in yet another embodiment, it may be desired to schedule jobs on a grid to meet a throughput goal. For example, a grid user may desire that jobs be scheduled such that a certain number of jobs (target throughput F) are completed per hour. The scheduling process 100 includes solving a defined mathematical model to determine the optimum number of jobs (n) to run on the grid to meet the specified throughput goal (F) (action 128). Accordingly, the actual throughput f(n) should be optimized to meet the throughput goal (F):

$$(F-f(n-1))>0 \text{ and } (F-f(n))<=0.$$

Actual throughput f(n) may be dependent on the estimated run time of each particular job ($R_i$) and the available number of slots (K) on the grid. In some embodiments, run time ($R_i$) will be variable amongst jobs, while in other embodiments run time may be uniform. Accordingly, actual throughput f(n) for a particular number of running jobs may be determined as follows:

$$f(n)=1/R_2+1/R_2+\ldots+1/R_n.$$

Various throughput data f(n) may then be evaluated against the target throughput F according to the following throughput algorithm:

| | |
|---|---|
| Action 1: | n = 1; |
| Action 2: | D = F − f(n); |
| Action 3: | if D > 0; n = n + 1; go to action 2; |
| Action 4: | if n <= K; then find the answer; exit else cannot find n to meet the goal, trigger the goal violation action. |

If the optimum number of jobs (n) is determined and is less than the number of slots (K) in the grid, the jobs can be sent to the resource management scheduler, which assigns the jobs to the appropriate number of slots (action 124). However, if the optimum number of jobs (n) is greater than the available slots (K) in the system, then a violation action may be triggered (action 132) and communicated to the grid user, such as by an email notification.

Throughput Example

By way of example, it is desired that jobs be executed on the grid while guaranteeing a throughput of 20 jobs per hour. In this example, the grid system has 12 slots available to run the jobs and each job has an average runtime of 10 minutes. The optimum number of jobs (n) to meet the throughput goal of 20 jobs per hour is determined as follows:

| | |
|---|---|
| Action 1: | n = 1 |
| Action 2: | D = 20 − (1/1/10) = 10 > 0 |
| Action 3: | D = 20 − (1/1/10 + 1/1/10) = 0. |
| Action 4: | 2 <= 12. |

Therefore, the optimum number of jobs that should currently be running on the grid is 2. Accordingly, 2 jobs are sent to the resource management scheduler, which schedules the jobs to 2 slots.

D. Queue Time Goal

Figure 10:
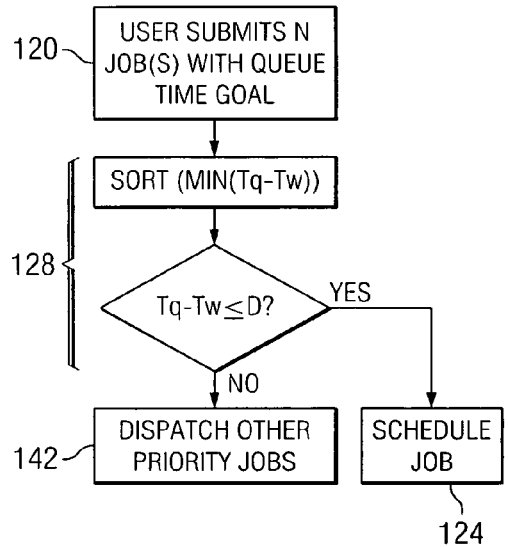
FIG. 10 is a flowchart depicting a job-scheduling method to schedule a job having a queue time goal.

Referring to FIG. 10, in yet another embodiment, it may be desired to schedule N jobs on a grid to meet a queue time goal. For example, a grid user may desire that the N jobs be scheduled such that they remain in a queue for no longer than a specified time ($T_q$). Accordingly, the scheduling process 100 entails solving a defined mathematical model to determine the optimum waiting time ($T_w$) for a pending job to meet the queue time goal ($T_q$) (action 128).

Queue time and dispatching of jobs according to queue time may be affected by the system maximum dispatch time (D), which is typically a constant value for each grid system.

Accordingly, the actual waiting time $T_w$ should be optimized to meet the queue time goal $T_q$:

$$T_q - T_w <= D.$$

Various waiting time data $T_w$ for each pending job subject to the queue time goal may then be evaluated against the queue time goal $T_q$ according to the following queue time algorithm:

| | |
|---|---|
| Action 1: | Sort(min($T_q - T_w$)) |
| Action 2: | if $T_q - T_w$ <= D, dispatch job |
| Action 3: | repeat action 2 until find job $T_q - T_w$ > D, then dispatch other priority jobs. |

Upon determining the optimum waiting time $T_w$ for meeting the queue time goal $T_q$, the pending job will be sent to the resource management scheduler, which will then assign the job to an appropriate slot (action 124) prior to expiration of the waiting time $T_w$. If the jobs having a queue time goal $T_q$ are all dispatched or the system maximum dispatch time D is determined to be less than the difference between the queue time goal and the actual waiting time $T_w$, then scheduling process 100 may be configured to dispatch other priority jobs (action 142).

Queue Time Example

By way of example, it is desired that a pending job remain in a queue for execution for no longer than 5 minutes. In this example, the grid system has a maximum dispatch time of 10 minutes. The optimum waiting time $T_w$ to meet the queue time goal of 5 minutes is determined as follows:

| | |
|---|---|
| Action 1: | Sort(min(5-4, 5-1, 5-2)) where sample waiting times are 4 minutes, 2 minutes and 1 minute; |
| Action 2: | 5-4 <= 10, therefore dispatch job; |
| Action 3: | repeat action 2 for additional jobs. |

Therefore, the optimum waiting time $T_w$ is 4 minutes. Accordingly, the pending job is sent to the resource management scheduler, which schedules the job to a slot after the expiration of the specified waiting time of the job.

Various jobs may be created to have multiple goal requirements. Thus, jobs may have any combination of the above-described goal requirements, as well as additional goal requirements. Also, the mathematical models associated with the above-described goals are exemplary in nature, and can be altered without departing from the scope of this disclosure.

In some embodiments, the grid user may have a service level agreement (SLA) with the computing grid administrator. Accordingly, jobs and associated goal requirements may be executed on the grid under various service classes associated with the SLA, thereby providing service treatment and privileges to the grid user's request as defined by the service class.

A preferred syntax associated with the service class may be available to the grid user through which job requests can be input into the grid system and assigned according to the goal requirements associated with the job requests. The syntax defines the service class by naming the service class, prioritizing the service class and associating job execution goals with the service class. Accordingly, the individual service classes can function as goal-oriented predictive schedulers. In one embodiment, the service class may be defined as follows:

Begin Service Class
NAME=service class name
PRIORITY=positive integer
GOALS=[goal] [goal]
End Service Class The NAME parameter may be any name that identifies the service class and can be implemented as an ASCII string, including letters, digits, underscores and/or dashes.

A PRIORITY parameter indicates the service class priority. In some embodiments, higher integer values assigned to the PRIORITY parameter will indicate higher levels of priority while lower integer values will indicate lower levels of priority. As such, the jobs within the service classes are able to access grid resources by level of priority. If multiple service classes have the same priority, the grid can run the jobs from these service classes in a first come, first serve order.

A GOAL parameter defines the service-level goals for the particular service class. The service class may have one or more goals, each of which may be active at varying times. For example, the service class may include a throughput goal active each day from 4 pm-9 pm. In this scenario, the 4 pm-9 pm time period may be referred to as a time window during which the jobs associated with the service class are scheduled to meet the throughput goal. Outside of the time window, the jobs are scheduled as if no service class has been defined. However, the time window is optional and no specified time period need be stated. Thus, when no time window is specified, the goal is always active. Additionally, several goals may be active at the same time. For example, a job may be scheduled to meet both a throughput goal and a velocity goal during the same time window or overlapping time windows.

The various goals may be defined for a particular service class as follows:
GOALS=[THROUGHPUT num_jobs [timeWindow (time_window)]];
GOALS=[VELOCITY num_jobs [timeWindow (time_window)]];
GOALS=[DEADLINE timeWindow(time_window)]; and
GOALS=[QUEUE TIME timeWindow(time_window)].

Multiple goals may be assigned to one service class. For example, if it is desired to assign a deadline goal and a velocity goal to a service class, the grid user may input the following parameters:
GOALS=[deadline timeWindow(time_window)]\[velocity num_jobs [timeWindow(time_window)]].

Moreover, additional parameters may be defined for the service class, such as USER_GROUP, CONTROL_ACTION and DESCRIPTION parameters. In some embodiments, it may be desired to provide a particular group access to the service class. This may be pertinent in scenarios where a group or team is tasked with job execution on the grid. Accordingly, a USER_GROUP parameter may be introduced to the service class, thereby permitting all members of the user group to submit jobs to the service class.

In still further embodiments, a CONTROL_ACTION parameter may be defined to effect an action command if satisfaction of the goal is delayed. The action command may be any specified action, such as a "pageme" action, which can cause a page to be sent to a grid user should job execution fail to meet the goal. For example, if a goal is delayed for a time period exceeding a defined goal period, such as a VIOLATION_PERIOD, then the pageme action will be invoked. In one example, it may be desired that a control action be invoked should the goal be in violation for a period exceeding five minutes. Accordingly, the CONTROL_ACTION parameter can be input as follows:

CONTROL_ACTION=VIOLATION_PERIOD[5]CMD [pageme].

If the service class has multiple active goals, then actions may be invoked for each goal violation. Moreover, various action commands are contemplated, and different action commands may be associated with different goal violations. Still further, the CONTROL_ACTION parameter may be dynamically invoked should the goals associated with the user-requested jobs be too aggressive. Thus, the CONTROL_ACTION parameter may initiate a negotiation with the grid user to arrive at a more realistic goal, or alternatively or additionally, the control action may respond by enabling additional resources to bring the goal out of violation.

It may also be desired to provide a description of various service classes to enable a grid user to evaluate which service classes are appropriate for job execution. As such, a DESCRIPTION parameter may be utilized to provide information describing the particular features of the service class. Accordingly, grid users can view the description when picking a service class.

While various embodiments of a goal-oriented predictive scheduler according to the principles disclosed herein, and related methods of performing goal-oriented predictive scheduling, have been described above, it should be understood that they have been presented by way of example only, and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A method for scheduling jobs in a networked computing grid, comprising:
   creating one or more service classes having defined job execution goals;
   submitting jobs, each having one or more defined goal requirements, to the one or more service classes;
   associating the jobs with the one or more service classes in accordance with the defined goal requirements associated with the jobs and the job execution goals of the one or more service classes;
   scheduling the jobs according to the job execution goals;
   defining a service class priority for the one or more service classes, the jobs associated with the one or more service classes being executed according to the service class priority; and
   defining a control action parameter for the one or more service classes, the control action being invoked if job execution according to the job execution goal requirements is delayed, wherein the job execution goals are active only during specified time windows.

2. The method of claim 1 further comprising defining a service class name for the one or more service classes.

3. The method of claim 1 further comprising defining a user group parameter for the one or more service classes, the user group being provided to limit access to the one or more service classes.

* * * * *